United States Patent
Plom et al.

(10) Patent No.: US 11,165,729 B1
(45) Date of Patent: Nov. 2, 2021

(54) GENERATING AND DISPLAYING CONTEXTUAL AUDIOVISUAL CONTENT

(71) Applicant: Twitter, Inc., San Francisco, CA (US)

(72) Inventors: Richard Plom, San Francisco, CA (US); Sean Thompson, Boulder, CO (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/902,082

(22) Filed: Jun. 15, 2020

(51) Int. Cl.
*G06F 13/00* (2006.01)
*H04L 12/58* (2006.01)
*H04N 21/84* (2011.01)
*H04N 21/43* (2011.01)

(52) U.S. Cl.
CPC ............ *H04L 51/10* (2013.01); *H04L 51/063* (2013.01); *H04L 51/32* (2013.01); *H04N 21/4307* (2013.01); *H04N 21/84* (2013.01)

(58) Field of Classification Search
CPC ....... H04L 51/10; H04L 51/32; H04L 51/063; H04N 21/4307; H04N 21/84
USPC ......... 709/204–206; 715/751–759, 231, 230, 715/733, 716–717, 229; 345/629–641
See application file for complete search history.

(56) References Cited

U.S. PATENT DOCUMENTS

| | | | | |
|---|---|---|---|---|
| 9,866,902 B2 * | 1/2018 | Flores | ..................... | H04L 67/10 |
| 10,652,618 B2 * | 5/2020 | Sarkar | ................ | H04N 21/2541 |
| 2017/0208362 A1 * | 7/2017 | Flores | ..................... | H04L 65/60 |
| 2018/0234738 A1 * | 8/2018 | Sarkar | ................ | H04N 21/2743 |
| 2020/0275159 A1 * | 8/2020 | Sarkar | ................ | H04N 21/4223 |

OTHER PUBLICATIONS

Logitech, "Logitech Capture Video Recording & Streaming Software," (Logitech Capture Overview), retrieved from the internet on Oct. 11, 2019 at URL <https://www.logitech.com/en-us/product/capture#logitech-pass>, 2019, 7 pages.

guidingtech.com [online], "How to Add Reactions to Videos on TikTok," retrieved from the Internet on Jan. 4, 2021, Jan. 19, 2019, 12 pages.

techcrunch.com [online], "TickTok adds video reactions to its newly-merged app," retrieved on Jan. 4, 2021, Sep. 3, 2018, 3 pages.

\* cited by examiner

*Primary Examiner* — Kenneth R Coulter
(74) *Attorney, Agent, or Firm* — Fish & Richardson P.C.

(57) ABSTRACT

Methods, systems, and apparatus, including computer programs encoded on computer storage media, for generating and displaying contextual audiovisual content as a reaction video. One of the methods includes receiving a request from a user; and in response: receiving an input from the user identifying an incoming message of an incoming message stream coming into the user device from the platform, receiving an input from the user using the user device, wherein the input selects content from the incoming message as a subject content item; displaying the subject content item on a display of the user device; while displaying the subject content item, recording a user authored video; generating a reaction video, comprising generating a reaction video frame for each user authored video frame, and generating, as the reaction message, a social messaging platform message comprising the reaction video.

24 Claims, 7 Drawing Sheets

GENERATING AND DISPLAYING CONTEXTUAL AUDIOVISUAL CONTENT

BACKGROUND

This specification relates to generating and displaying audiovisual content on social messaging platforms.

Social messaging platforms and network-connected personal computing devices allow users to create and share content across multiple devices in real-time.

Sophisticated mobile computing devices such as smartphones and tablets make it easy and convenient for people, companies, and other entities to use online social networking messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform without specific designation by the authoring user.

SUMMARY

This specification describes technologies for generating and displaying contextual audiovisual content as a reaction video. These technologies generally involve obtaining a subject content item and a user-authored video, e.g., a video recorded by a user on a user device as a reaction to the subject content item; and generating a reaction video that has a number of video frames. Each video frame has content from the user-authored video superimposed on content from the subject content item.

The user-authored video can be a video of a user reacting to the subject content, e.g., a message, image, or video of some person, place, thing, location, or event.

A user device, with appropriately configured client software, generates a reaction video from the subject content and the user-authored content. Alternatively, an appropriately configured online social messaging platform can receive one or both of the subject content and the user-authored content and generate a reaction video of contextual audiovisual content.

The user-authored content can be recorded at the same time as with the subject content, or can be recorded after the subject content is recorded. For example, a user device records the subject content while recording a user's reaction to the subject content. In some implementations, the user device records the reaction to subject content previously saved in memory on a user device. In those implementations, the user device is configured to play back the subject content on a display of the user device while recording the user-authored content. The user device generates a "live preview" of the user-authored video that is displayed on the user device as it is recorded. The live preview occupies a portion of the display, in which the subject content is still visible on the display of the user device.

In some implementations, the user device sends a request for a subject content item stored on an online social messaging platform. In turn, the online social messaging platform is configured to respond to the request for the subject content item, e.g., by including the content item as part of a message stream sent to the user device. The online social messaging platform can store a high-resolution version of the subject content, but send a reduced-resolution version of the subject content in response to the request from the user device. The user device plays back the reduced-resolution subject content while the user records the user-authored video. Then, the user device sends the user-authored video to the platform. In some implementations, the platform generates a reaction video using the user-authored video and the high-resolution version of the subject content.

The subject content item can be a message from a message stream that the user device has received from the online social messaging platform. A user device is configured to receive metadata that specifies content for each message in the message stream, e.g., as a JSON data object, and values defining how the message stream should appear visually on a display of the user device when rendered by the user device.

The user device is configured to obtain metadata corresponding to the subject content item, and to generate the reaction video by first rendering the message. Then, the user device generates the reaction video frame-by-frame. At each frame, the user device superimposes a frame of the user-authored content over a rendered image of the message. The user device can synchronize an audio soundtrack of the user-authored video with each video frame of the reaction video.

The subject matter described in this specification can be implemented in particular embodiments so as to realize one or more of the following advantages. Subject content, and contextual content relating to the subject content, can be automatically generated and displayed in a compact way, as a reaction video. A user device can generate a reaction video by rendering the subject content from metadata representing the message. In doing so, the user device can respond to a request to generate a reaction video in a more memory-efficient way, because the subject content can be rendered as part of the reaction video rather than the user device having to generate and store a separate image for the selected message, e.g., as a screenshot.

Additionally, the user device can leverage existing functionality of a user device configured to receive metadata and to render messages of a message stream of an online social messaging platform. The user device can render an image of a message selected as the subject content item from metadata previously sent to the user device. As a result, the user device is not limited to a screenshot or image of a message of a particular resolution. Instead, the message can be rendered to a same resolution as the reaction video.

Both subject content and user-authored content can be generated simultaneously, to improve the speed at which the contextual audiovisual content is generated.

The user device can be configured to receive a lower-resolution subject content item, e.g., from a requested message stream of the online social messaging platform. The user can record a reaction to the subject content item, and the platform can be configured to receive the user-authored video. The platform can generate the reaction video using a higher-quality version of the subject content item, instead of streaming the higher-quality version to the user device, which is more costly to transmit over a network. Additionally, by providing the user-authored video to the platform, the platform can generate the reaction video at a resolution that can be higher than the native resolution of the user device. Other devices capable of rendering video at a higher resolution than the user device can request the reaction video from the messaging platform.

A user interface for a client software implementing the technologies described in this specification facilitates generation of contextual audiovisual content by flexibly generating a reaction video from subject and user-authored content as platform messages, videos, and images.

Subsequently, reaction videos can be stored at the user device or posted to an online social messaging platform. The client software is configured to allow the user to modify one or both of the subject content and user-authored content, for example to synchronize the playback of both the subject and user-authored content.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
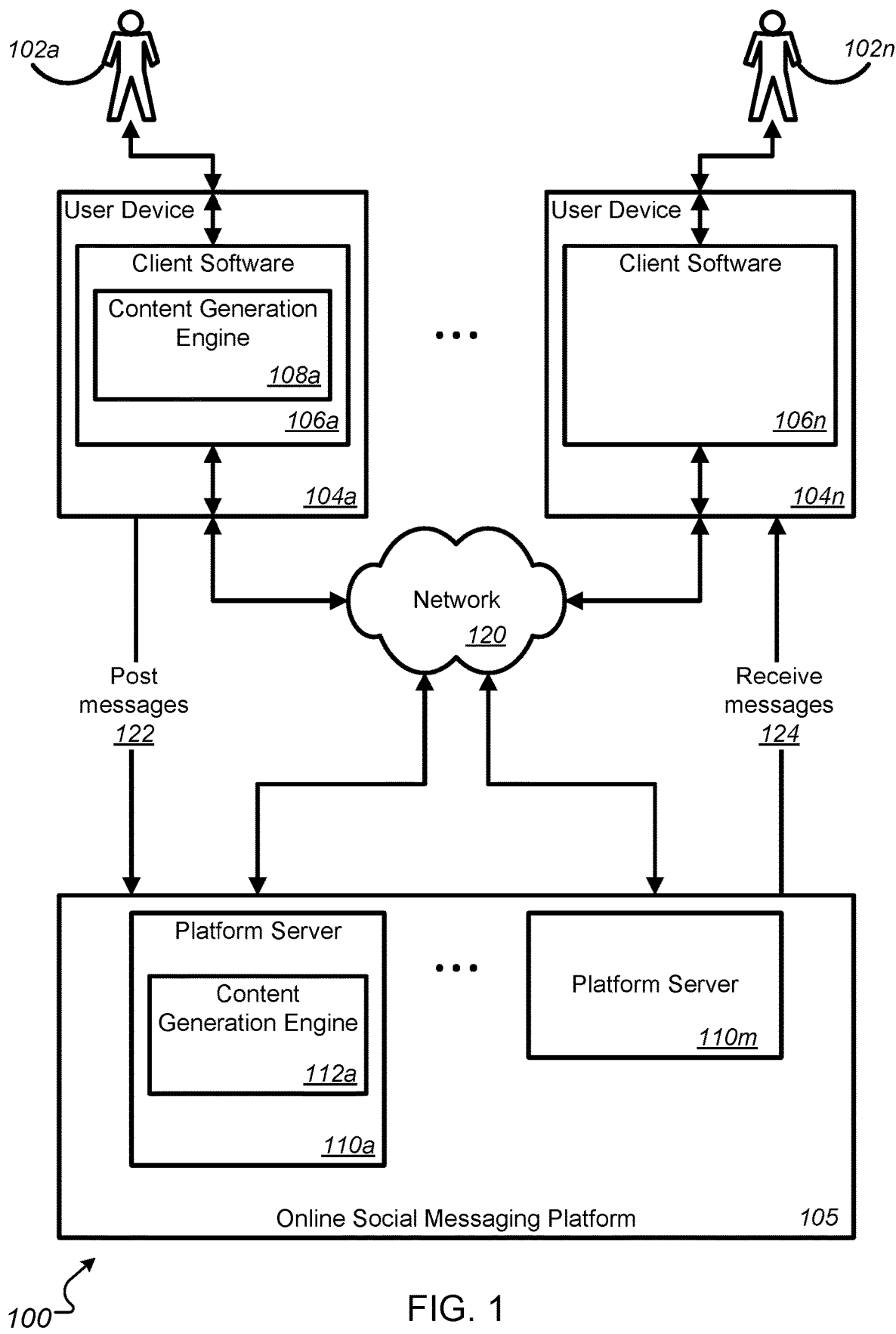
FIG. 1 illustrates an example online social messaging platform and example user devices.

FIG. 1 illustrates an example online social messaging system including an online social messaging platform 105 and user devices 104a-104n operated by users 102a-102n. A user may be an account holder of a user account, or an authorized user of an account, on the platform 105.

A user device can be any Internet-connected device, e.g., a laptop or desktop computer, a smartphone, or an electronic tablet. The user device can be connected to the Internet through a mobile network, through an Internet service provider (ISP), or otherwise. A user device includes a front-facing camera, a rear-facing camera, a microphone, and software to record pictures, audio, and video. The "front-facing camera" is a camera that faces the user while the user is operating the device. The camera facing the opposite direction is the "rear facing camera."

User device 104a is configured with client software 106a, which includes content generation engine 108a. The functionality of the content generation engine 108a is described in detail, below.

The platform 105 is implemented on one or more platform servers 110a-110m that are each implemented on one or more computers located at one or more locations. Each platform server supports connections to and from the user devices over wired or wireless networks of one or more data communication networks 120. Platform server 110a is configured with content generation engine 112a, the functionality of which is described, below.

Platform software and client software 106a-106n are configured to enable users 102a-102n to use the platform 105 to post messages 122 to the platform and to use the platform to receive messages 124 posted by other users, as well as to engage in other social activities. The client software may be a web browser or an HTML (hypertext markup language) document rendered by a web browser. Or the client software may be script or another type of software code, e.g., JavaScript code or Java code. Or the client software may be dedicated software, e.g., an installed app or installed application that is designed to work specifically with the platform 105. Or the client software may be or include a Short Messaging Service (SMS) interface, an instant messaging interface, an e-mail-based interface, or an API function-based interface, for example.

In operation, the client software can access the platform so that a user can post and receive messages, view, and curate the user's streams, and view and interact with lists of content items. A stream is a stream of messages on the platform that meet one or more stream criteria. A stream can be defined by the stream criteria to include messages posted by one or more accounts.

The client software receives a message as message metadata that includes a data object defining one or more fields of data characterizing the message. For example, the data object can be of a container data type, and the fields can include data representing content provided by the author of the message. The types of data that may be stored in a message as fields in message metadata include text, graphics, images, video, and computer code. The metadata can also include resource addresses, e.g., URL addresses, of locations in which audiovisual content is stored. Other examples of message metadata include content of the message as one or more data fields, e.g., the text of the message, a time and date of authorship, and a geographical location of the user device when it submitted the message. The metadata received for the subject content can be formatted according to any conventional markup language, e.g., XML, JSON, or HTML.

The client software is configured to receive the message metadata, and render a corresponding message for display on a user device. The client software renders the message according to a predetermined visual layout. Because the user devices 104a-104n can have displays of different resolutions, user devices may receive the same message metadata and render the content in the message metadata according to the native resolution of a respective user device. As part of rendering the message for display on the user device, the client software retrieves audiovisual content stored at locations referenced by resource addresses in the metadata. The client software is configured to display the message as part of a message stream.

Figure 2:
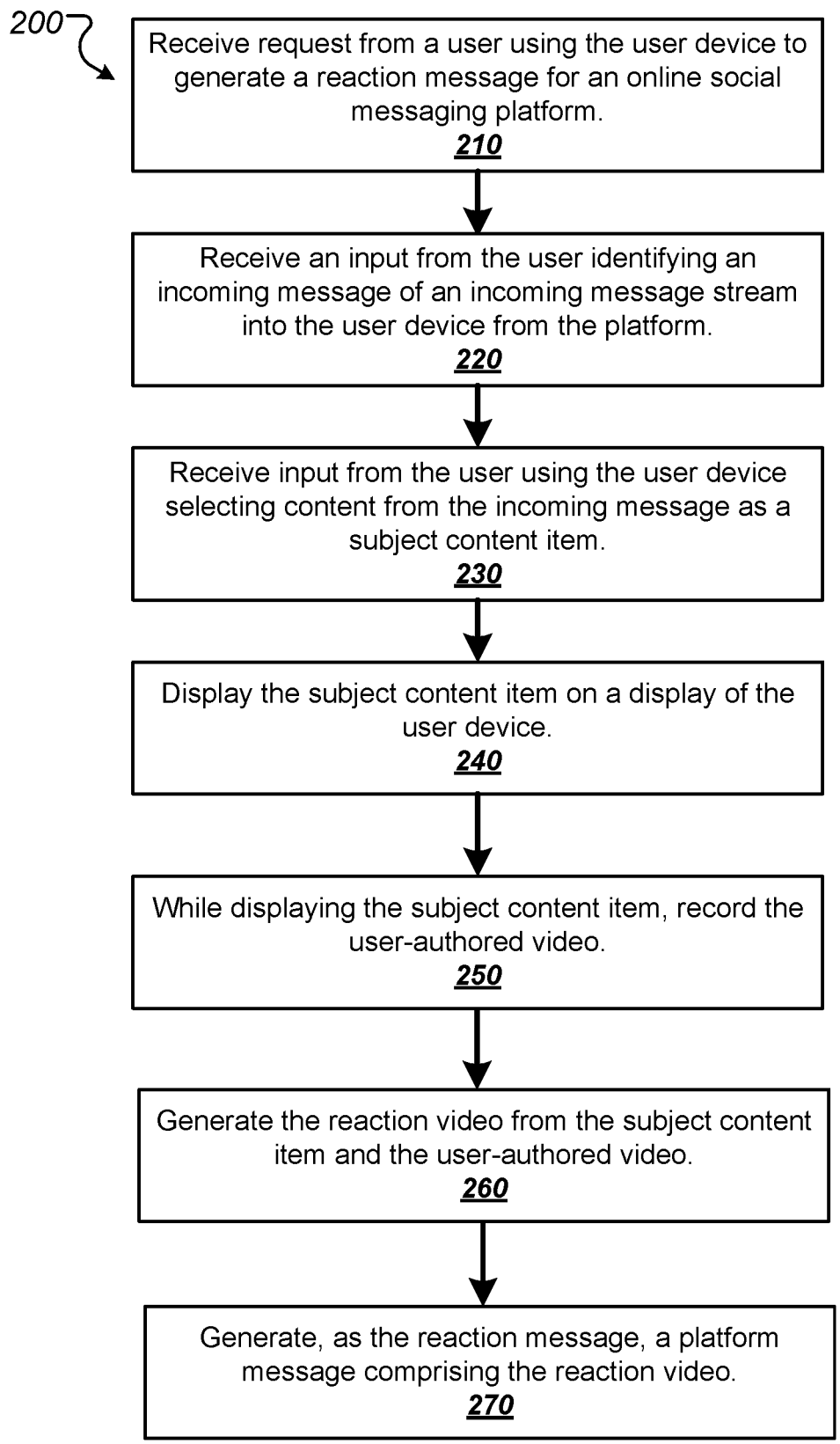
FIG. 2 is a flowchart of an example process for generating a reaction video on a user device.

FIG. 2 is a flowchart of an example process 200 for generating a reaction video on a user device. For convenience, the process 200 will be described as being performed by one or more computers, located in one or more locations, and programmed appropriately in accordance with this specification. For example, an online social messaging system, e.g., the online social messaging system 100 of FIG. 1, appropriately programmed, can perform the process 200.

A user device receives a request from the user using the user device to generate a reaction message for an online social messaging platform (210). A reaction message is a message that includes a reaction video. A reaction video is a video that displays, at each frame of the reaction video, a frame from a user-authored video superimposed over content from a subject content item. A subject content item can be any kind of audiovisual content, e.g., a video, a message of the platform, or an image. A subject content item can be all or part of a message of an incoming message stream to a user device. Alternatively, the subject content item can be content saved in memory on the user device. In some implementations, described below, the client software can record the subject content item while recording the user-authored video.

A user authored video is a video of, and made by, a user to be provided with the subject content item.

Client software for the user device receives an input from the user identifying an incoming message of an incoming message stream into the user device from the platform (220). The input can be a selection of the message after the client software renders message metadata for the incoming message stream. The client software provides a user interface element, e.g., a button, with the rendered message stream and corresponding to the incoming message. Alternatively, the client software can receive user input through a touch or kinetic gesture.

The client software receives input from the user using the user device selecting content from the incoming message as the subject content item (230). The input can indicate a portion of content in the incoming message as the subject content item, e.g., a particular video or image included as part of the message. Absent that, the input can indicate that the entire message is selected as the subject content item, including text and audiovisual elements included as part of the message.

The client software displays the subject content item on a display of the user device (240). If the subject content item is the whole incoming message, the client software renders the message fitted for the particular display of the user device and according to the native resolution of the display. If the subject content item is a video or image, the client software fits the subject content item to fill the entire display of the user device.

In some implementations, the client software is configured to change the orientation, e.g., from a "portrait" orientation to a "landscape" orientation, of displayed content automatically and in response to detecting that the orientation of the user device has changed past a certain predetermined angle. In response to detecting the change in orientation of the user device past the predetermined angle, the client software automatically adjusts the subject content item to fill the entire display, e.g., by changing the aspect ratio of the subject content item. Alternatively, in detecting the change in orientation from a portrait orientation to a landscape orientation, the client software changes the orientation of the reaction video to match the orientation of the user device and fills unused space on the display, e.g., by letterboxing. The client software can additionally adjust the resolution of the subject content item as necessary to match the native resolution of the display.

While displaying the subject content item, the client software records the user-authored video (250). The client software presents a "live preview" of the user-authored video as the video is recorded using a front camera of the user device. The live preview is overlaid over the subject content item that is displayed on the user device, and shows the user-authored video while the video is recorded. The live preview is displayed as a video inset in the displayed subject content. The live preview can be displayed in any position, orientation, and size on the display of the user device that allows for the subject content to still be visible.

In the case in which the subject content item is a video, the video plays on the user device while the client software records the user-authored video. The client software can loop the video if the video ends before the user recorded video is finished recording. In some implementations, the subject content video plays once while user authored video is recorded, and stops at its last video frame if the client software is still recording the user authored video.

If the subject content video includes a soundtrack, the client software balances the soundtrack to be at a volume less than the audio of the recording user-authored video. In some implementations, the client software provides options for further balancing the audio of the subject content video, and/or an option for muting the subject content video soundtrack altogether.

In some implementations, the client software provides user options for editing the subject content item while recording the user-authored video. For example, in response to user input, the client software adds or modifies graphics, animations, and visual or audio effects to the user-authored video, the subject content item, or both, in-time with recording the user-authored video. When the client software generates and plays back the reaction video, any added graphics, animations, or effects appear at the point in the reaction video in which they were added during recording the user-authored video.

The client software generates the reaction video from the subject content item and the user-authored video (260). The client software includes a content generation engine configured to generate the reaction video. The client software generates the reaction video by generating a reaction video frame for each user-authored video frame in the user-authored video. At each reaction video frame, a respective user-authored video frame appears superimposed over a portion of content from the subject content item. The client software superimposes the user-authored video frames in the sequence the frames appear in the user-authored video. In doing so, a portion of the subject message in the reaction video frame is obscured by the user authored video frame. As a result, when the reaction video is played, the user authored-video frames that are superimposed over the subject content are played back in the sequence in which they appear in the user-authored video.

The subject content for each reaction video frame depends on the format of the subject content item.

If the subject content item is the incoming message, then the client software generates the reaction video by rendering, for each reaction video frame and from message metadata previously received for the incoming message, the message across the entire user device display. The subject message is rendered as the message was displayed while the client software recorded the user-authored video using the front-facing camera. Also at each reaction video frame, the client software superimposes a frame of the user-authored video over the rendered subject message.

If the subject content is an image, the subject content of the reaction video at each frame is the image itself.

If the subject content item is a video, then the subject content of each reaction video frame is a frame from the subject content video. For each reaction video frame, a user-authored video frame is superimposed over a subject content video frame. As a result, when the reaction video is played, both subject content video frames and the user-authored video frames superimposed over the subject content video frames are played back in the sequence in which the videos were initially recorded.

The client software can generate a reaction video while simultaneously recording both the subject content and the user-authored video. In some implementations, the client software records subject content through a rear-facing camera of the user device, while recording the user-authored video through a front-facing camera of the user device. While the user device records both the subject content and the user-authored video, the user device displays the user-authored video as a live preview overlaid on a live preview of the recording subject content.

While the user device is simultaneously recording both the subject content and the user-authored video, in some implementations, the client software automatically generates the reaction video, frame-by-frame. The live previews of both the subject content and user-authored video on the display of the user device shows each frame of the reaction video, as the reaction video is being generated. Absent that, the client software generates reaction video after the recording of the subject content and the user-authored video is complete.

The client software superimposes each user-authored video frame uniformly according to a predetermined position, orientation, and size. In some implementations, client software receives user input specifying a position, orientation, and/or size for the user-authored video as it appears in the reaction video. As part of receiving user input, the client software can play back the reaction video after the video is generated, with a prompt to the user to finalize the reaction video. The prompt can also include an interface for scrolling, e.g., by touch input, to different points in the reaction video. At any point in the reaction video the client software may provide an interface for adding or modifying graphics, animations, or effects to the reaction video. The client software can, for example, receive user input specifying different graphics, video filters, or text to include in the reaction video, and in response to the input, make the corresponding modifications.

In some implementations, the client software automatically edits the subject content item, the user-authored video, or both. For example, if the subject content is a video, the content generation engine determines whether one of the subject content video and the user-authored video is shorter than the other, and in response, lengthens the shorter video by looping the shorter video until it is the same length as the longer video. Alternatively or in addition, the content generation engine lengthens the shorter video by increasing the playback rate, e.g., by a fixed rate calculated by the content generation engine to result in the shorter video being the same length as the longer video. Alternatively, the client software edits the subject content, the user-authored video, or both, only in response to user input.

In some implementations, the client software can receive user input to toggle or otherwise adjust the soundtrack of a reaction video generated from recorded audio of the subject content and the user-authored video. In one example, the client software generates the soundtrack for the reaction video from only the recorded subject content, only the recorded user-authored video, or audio from both the subject content and the user-authored content.

When only the user-authored video includes a soundtrack, the client software generates the reaction video with a soundtrack matching the user-authored video. When both the user-authored video and the subject content item include a soundtrack, in some implementations, the client software mutes one of the audio soundtracks in response to user input.

Alternatively, the client software generates a soundtrack for the reaction video from both the subject content and the user-authored video soundtracks. As described above with reference to the description of recording the user-authored video (250), the client software can balance audio from both soundtracks, automatically or in response to user input.

Referring back to FIG. 2, the client software generates, as the reaction message, a platform message including the reaction video (270). The client software can then post the reaction message to the platform to become part of an outgoing message stream. After the reaction message is posted, the message can be viewed by other users of the platform, e.g., because client software of one of the other users sends a request for content that includes the posted message.

In some implementations, one or more platform servers of the platform are configured to generate a reaction video using a content generation engine implemented on the servers. The messaging platform, through the one or more platform servers, can receive subject content and a user-authored video from a user device, and in response, generate a reaction video from the subject content and the user-authored video, and send the reaction video back to the user device.

Figure 3:
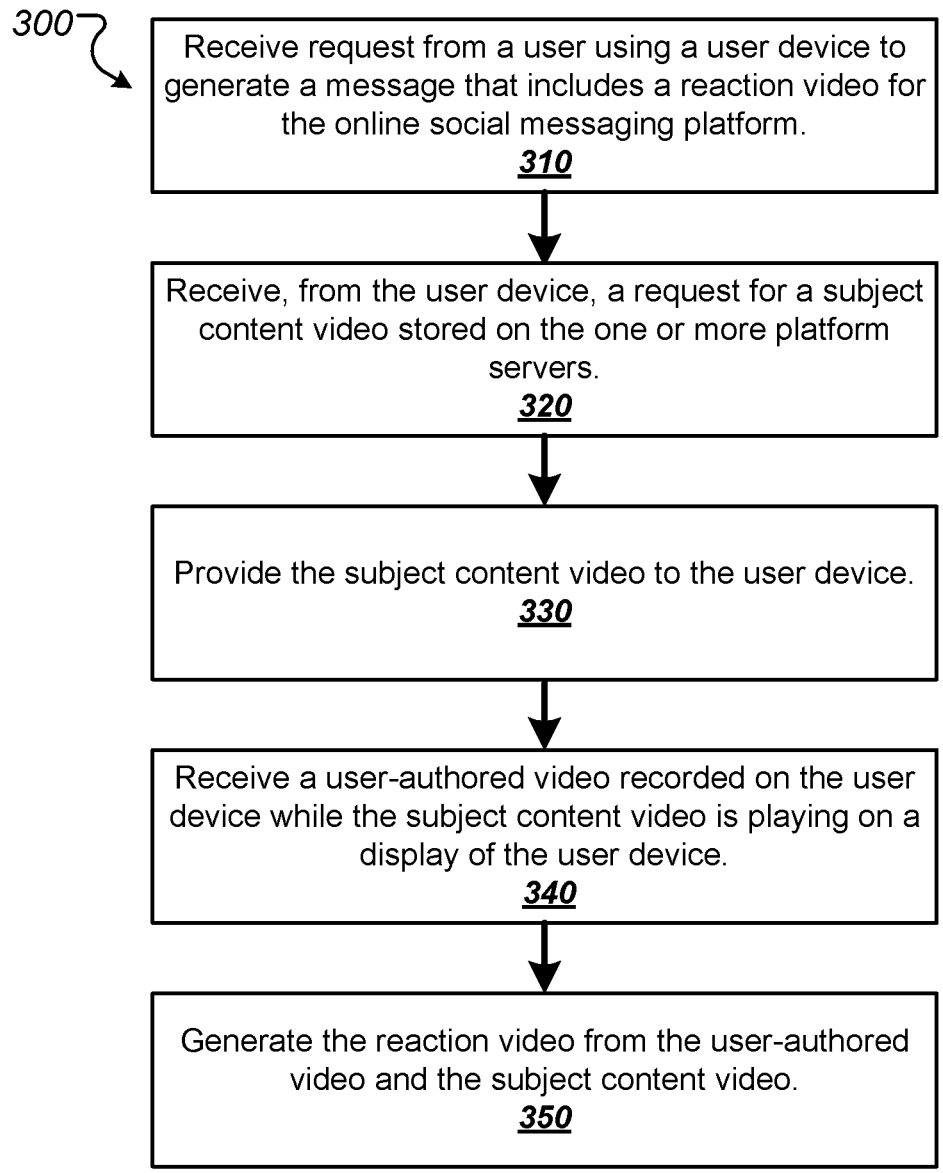
FIG. 3 is a flowchart of an example process for generating a reaction video on a messaging platform.

FIG. 3 is a flowchart of an example process 300 for generating a reaction video on a messaging platform. For convenience, the process 300 will be described as being performed by one or more computers, located in one or more locations, and programmed appropriately in accordance with this specification. For example, an online social messaging platform, e.g., the online social messaging platform 105 of FIG. 1, appropriately programmed, can perform the process 300.

The platform server receives a request from a user using a user device to generate a message that includes a reaction video for the online social messaging platform (310).

The platform receives, from the user device, a request for a subject content video stored on one or more platform servers of the platform (320). In general, the platform is configured to store subject content, including videos shared on the messaging platform, at a resolution matching the highest native resolution of any user device communicating with the messaging platform. Because the messaging platform stores content at the highest native resolution of any user device, the messaging platform is equipped to respond to any request for content at a resolution matching the requesting user device.

The platform provides the requested subject content video to the user device (330). As part of providing the requested subject content video, the platform determines the native resolution of the requesting user device. The platform sends the requested subject content video at the native resolution for the user device. In some implementations, the platform sends the requested subject content video at a resolution lower than the native resolution of the requesting user device. This is done, for example, to reduce network traffic. For example, the platform stores a subject content item at a 1920×1080 pixel resolution, but sends a reduced-resolution subject content item, e.g., at 1280×720 pixel resolution.

The platform receives a user-authored video recorded on the user device while the subject content video is playing on the display of the user device (340). In implementations in which the platform sends the requested subject content video at a reduced resolution that is lower than the native resolution of the requesting user device, the reduced resolution video is displayed while the client software records the user-authored video.

The platform generates the reaction video from the user-authored video and the subject content video (350). Specifically, the platform generates the reaction video at the same resolution as the subject content video stored on the one or more platform servers.

Next, different user interfaces implemented by client software are described below, with reference to FIGS. 4-7. The described user interfaces include one or more user interface elements. A user interface having a user interface element is configured to receive input by a user of a user device through the user interface element, and the client software implementing the user interface is configured to execute operations in response to the received input. User interface elements can be any conventional user interface element for receiving input from a user, e.g., buttons, drop-downs, sliders, tabs, or links.

Figure 4:
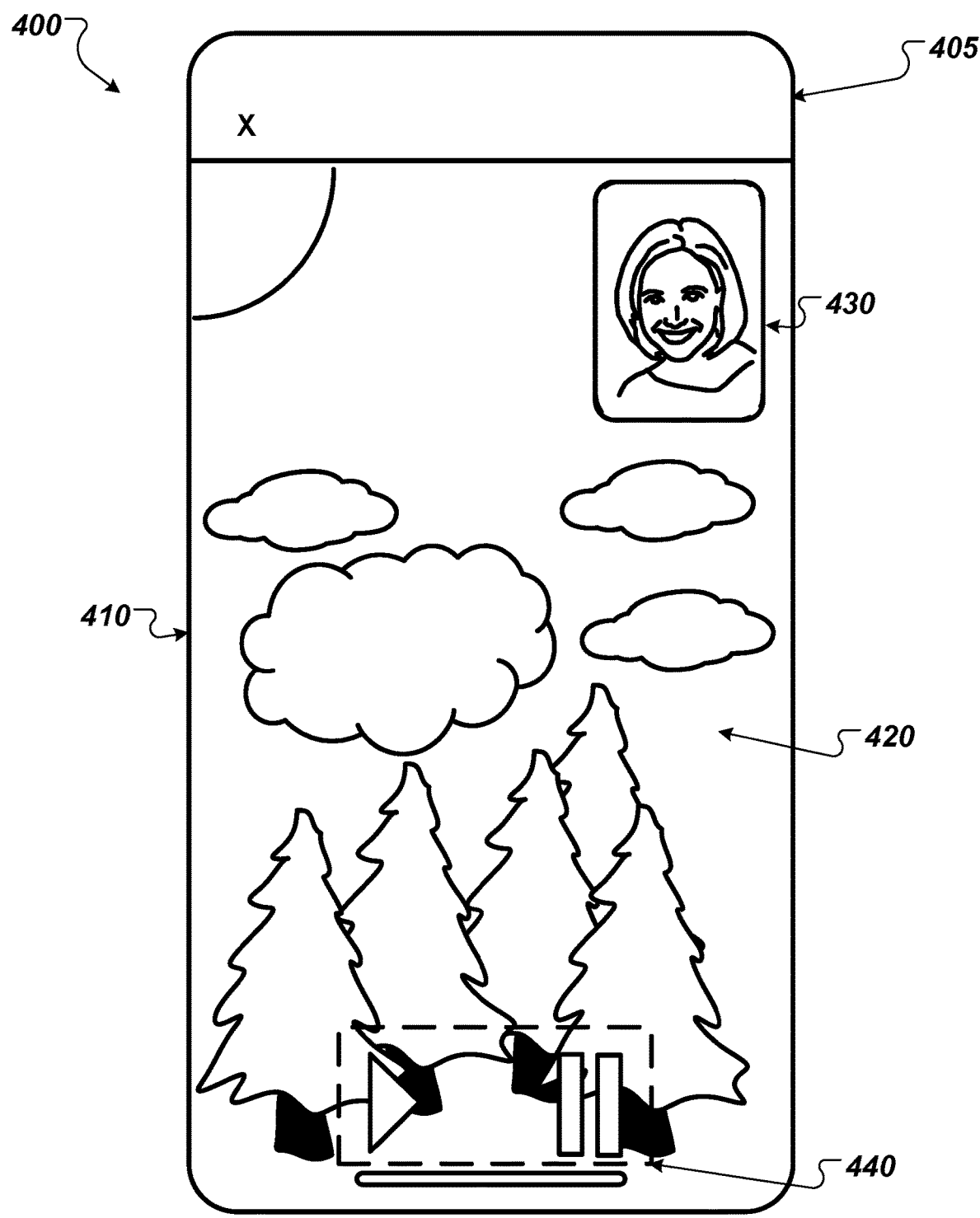
FIG. 4 illustrates an example user interface on a user device displaying contextual audiovisual content.

As shown in FIG. 4, an example user interface 400 is displayed on a user device 405 and displays a frame from a reaction video 410. Specifically, the example user interface 400 shows a subject content item 420, i.e., an image, and a frame of a user-authored video 430 superimposed over the subject content item 420.

Although the example user interface 400 shows the user-authored video 430 as being played back in the upper-right corner of the display of the user device 405, client software implemented on the user device 405 is configured to generate a reaction video that includes the user-authored content in any size, orientation, and position that does not completely obscure the subject content item 420.

The user interface 400 includes user interface playback elements 440. Client software implementing the user interface 400 receives input from a user interacting with the playback elements 440, and in response, pauses, plays, fast-forwards, or performs other actions related to the playback of the reaction video 410.

Figure 5:
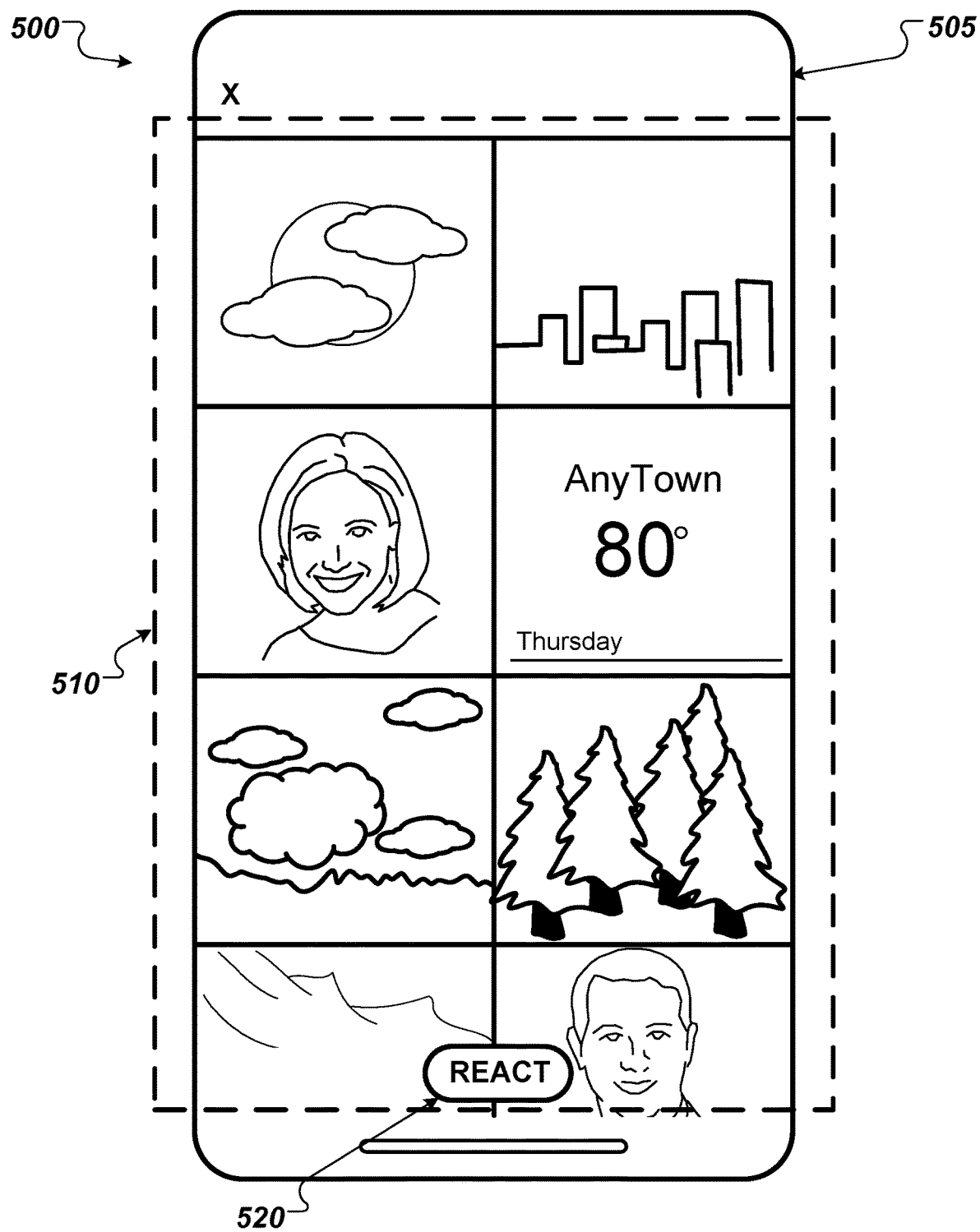
FIG. 5 illustrates an example user interface with a user interface element for selecting a subject content item.

As shown in FIG. 5, an example user interface 500 is implemented by client software on a user device 505 for selecting a subject content item. The user interface 500 can display a number of user interface subject content elements 510 (indicated by a dotted outline in FIG. 3), with each subject content element corresponding to a respective image or video stored in memory that is accessible to the user device 505. The memory can be local to the user device 505, or the memory can be remote to the user device 505 but accessible remotely, e.g., over a network, such as the Internet or a local area network.

The user interface subject content elements 510 can be displayed on the user device 505 in any order and in any conventional format, e.g., as thumbnails of the image or video representing a corresponding subject content item, or as a link in which a corresponding video or image is stored to a location in memory accessible to the user device 505.

The user interface 500 can include more subject content elements than what can be displayed on the display of the user device 505 at a time. The user interface 500 accepts input from a user, e.g., a tap-and-drag finger gesture on the display of the user device 505, which causes the client software to scroll through the subject content elements 510.

The user interface 500 includes a user interface "react" element 520, that when interacted with by the user, causes the client software to change the user interface 500 to a user interface for recording a user-authored video in response to a selected one of the subject content items corresponding to one of the subject content elements 510.

Figure 6:
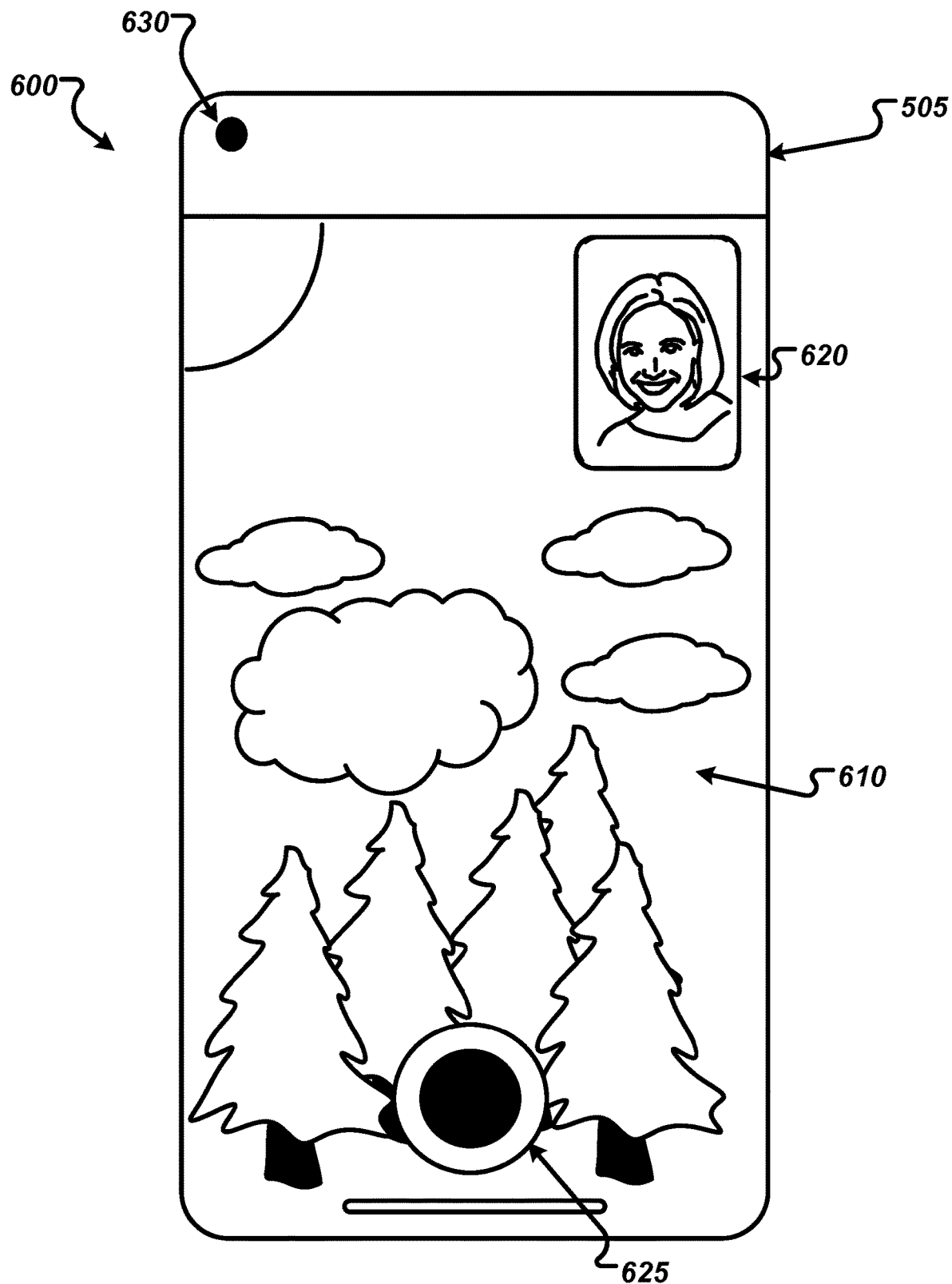
FIG. 6 illustrates an example user interface generated in response to receiving an input to a "react" user interface element.

As shown in FIG. 6, an example user interface 600 is generated by client software in response to receiving an input to the "react" element 520 of the user interface 500 of FIG. 5. The user interface 600 shows a selected subject content item 610. The client software implementing the user interface 600 shows the user interface 600 in response to receiving input indicating a selection of a subject content item and in response to receiving input from the "react" element 520 of FIG. 5.

The user interface 600 shows a live preview 620 of content captured by a front-facing camera 630. The client software implementing the user interface 600 turns on the front-facing camera 630 and presents the live preview 620 as part of the user interface 600.

The user interface 600 also includes a user interface "record" element 625. The client software implementing the user interface 600, in response to input received by a user of the client device 305 interacting with the record element 625, starts recording video using the front-facing camera 630.

While the user device 505 is recording the user-authored video, the user can monitor the content through the live preview 620. In addition to recording video by the front-facing camera 630, the user device 505 can record a corresponding soundtrack synchronized to the recorded user-authored video.

Figure 7:
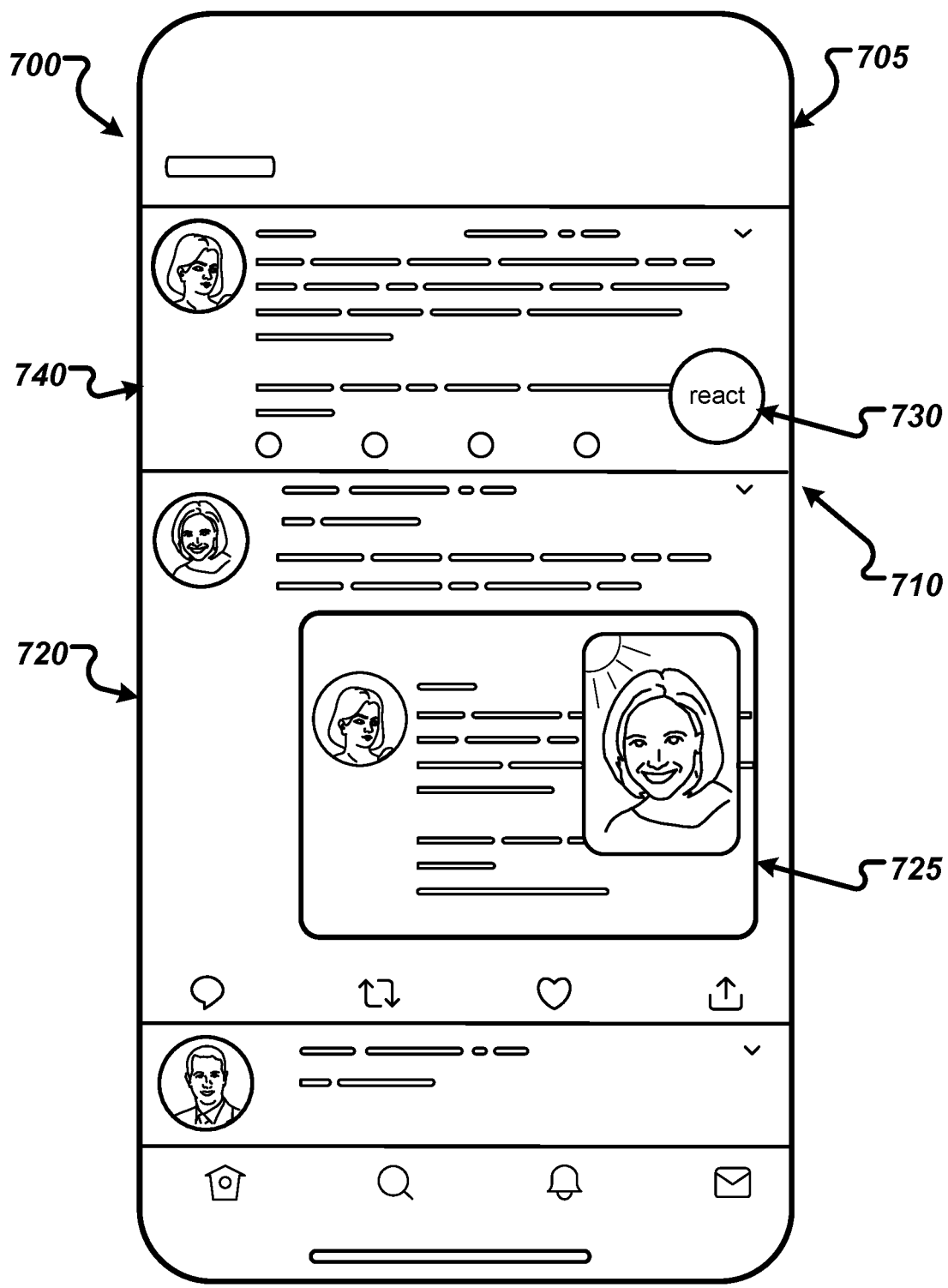
FIG. 7 illustrates an example user interface showing a message stream with a message that includes a reaction video of contextual audiovisual content.

As shown in FIG. 7, an example user interface 700 displayed on a user device 705 shows a message stream 710 with a message 720 that includes a reaction video 725. The client software implementing the user interface 700 can automatically play the reaction video 725 when at least a portion of the reaction video 725 is displayed on the user device 705. Alternatively or in addition, the user interface 700 accepts user input at the displayed portion of the reaction video 725, and in response, the client software presents a full-screen playback of the reaction video 725, e.g., as shown in the example user interface 400 of FIG. 4.

The user interface 700 also includes a user interface "react" element 730 to a message 740 of the message stream 710. In response to input at the "react" element 730, the client software displays a user interface for generating a reaction video with the message 740 as the subject content item. For example, the client software displays a user interface similar to the user interface 500 of FIG. 5, but with the message 740 as the subject content item. Then, the client software can record the user-authored video in response to the message 740 and generate a reaction video.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Although the present invention is defined in the attached claims, it should be understood that the present invention can also alternatively be defined in accordance with the following embodiments:

In addition to the embodiments of the attached claims and the embodiments described above, the following numbered embodiments are also innovative:

Embodiment 1 is a method comprising receiving a request from a user using a user device to generate a reaction message for an online social messaging platform; and in response to the request, performing, by client software implemented on the user device, operations comprising: receiving an input from the user identifying an incoming message of an incoming message stream coming into the user device from the platform; receiving an input from the user using the user device, wherein the input selects content from the incoming message as a subject content item; displaying the subject content item on a display of the user device; while displaying the subject content item, recording a user-authored video; generating a reaction video, wherein the reaction video comprises a plurality of reaction video frames, wherein generating the reaction video comprises generating a reaction video frame for each user-authored video frame, the reaction video frame including content from the subject content item and the content from the user-authored video frame, and generating, as the reaction message, a social messaging platform message comprising the reaction video.

Embodiment 2 is the method of embodiment 1, further comprising: posting the reaction message to the platform to become part of an outgoing message stream.

Embodiment 3 is the method of any one of embodiments 1 or 2, wherein the method further comprises sending the incoming message stream to the user device as metadata representing messages in the incoming message stream, including the incoming message; wherein generating the reaction video frame for each user authored video frame comprises: rendering an image of the incoming message from metadata representing the incoming message, and superimposing a respective user authored video frame from the user authored video over the image of the incoming message.

Embodiment 4 is the method of embodiment 3, wherein for each reaction video frame, the respective user authored video frame for the reaction video frame appears as an image inset in the subject content item.

Embodiment 5 is the method of any one of embodiments 3 or 4, wherein the metadata representing the incoming message is formatted as a data object comprising respective fields for content of the incoming message, and wherein rendering the image of the incoming message from the metadata comprises rendering the content according to a predetermined visual arrangement.

Embodiment 6 is the method of any one of embodiments 1 through 4, wherein the incoming message comprises an incoming video, wherein selecting the content from the incoming message as the subject content item comprises selecting the incoming video as the subject content item, and wherein generating the reaction video frame for each user-authored video frame comprises superimposing a respective user-authored video frame of the user-authored video over a portion of a respective incoming video frame of the incoming video.

Embodiment 7 is the method of embodiment 6, wherein the user-authored video comprises a synchronized user soundtrack, and wherein generating the reaction video further comprises including the synchronized user soundtrack with the corresponding user authored video frames of the user-authored video included in the reaction video.

Embodiment 8 is the method of any one of embodiments 6 or 7, wherein the user-authored video comprises a user soundtrack, wherein the incoming video comprises an incoming soundtrack, and wherein generating the reaction video further comprises: receiving an input that indicates one of the user soundtrack and the incoming soundtrack for a portion of the reaction video, and synchronizing the portion of the reaction video with the soundtrack indicated by the input.

Embodiment 9 is the method of any one of embodiments 1 through 8, wherein the request is a first request, the reaction video is a first reaction video, the user authored video is a first user authored video, and wherein the method further comprises: receiving a second request from the user using the user device to generate a message that includes a second reaction video for the platform; in response to the second request, performing, by server software implemented on one or more platform servers of the platform, operations comprising: receiving, from the user device, a request for a subject content video stored on the one or more platform servers; in response to the request, providing the subject content video to the user device; receiving, from the user device, a second user authored video, wherein the second user authored video is recorded on the user device while the subject content video is playing on a display of the user device; and generating the second reaction video, wherein the second reaction video comprises a plurality of reaction video frames, wherein generating the second reaction video comprises generating a second reaction video frame for each second user authored video frame of the second user authored video, wherein each second reaction video frame comprises content from the subject content video and content from the second user authored video.

Embodiment 10 is the method of embodiment 9, wherein the subject content video stored on the one or more platform servers is a subject content video at a first resolution, and wherein providing the subject content video to the user device comprises providing the subject content video to the user device at a second resolution, wherein the subject content video at the second resolution is represented with less data than the subject content item at the first resolution.

Embodiment 11 is the method of embodiment 10, wherein generating the second reaction video frame comprises superimposing the second user-authored video frame of the second user-authored video over a portion of the respective subject video frame of the subject content video.

Embodiment 12 is the method of embodiments 10 or 11, wherein, for each reaction video frame, the respective subject video frame for the reaction video frame is at the first resolution.

Embodiment 13 is a method comprising receiving a request from a user using a user device to generate a reaction message for an online social messaging platform; in response to the request, performing, by client software implemented on the user device, operations comprising: recording a subject content video on a first camera of the user device; while recording the subject content video on the first camera of the user device, recording a user-authored video on a second camera of the user device; and generating a reaction video, wherein the reaction video comprises a plurality of reaction video frames, wherein generating the reaction video comprises generating a reaction video frame for each user-authored video frame, the reaction video frame including content from the subject content video and the content from the user-authored video frame, and generating, as the reaction message, a social messaging platform message comprising the reaction video.

Embodiment 14 is the method of embodiment 13, wherein the first camera of the user device is a rear-facing camera, and wherein the second camera of the user device is a front-facing camera.

Embodiment 15 is the method of embodiments 13 or 14, wherein generating the reaction video frame for each user-authored video frame comprises superimposing the user-authored video frame over a portion of a respective subject video frame of the subject content video.

Embodiment 16 is the method of embodiment 15, wherein superimposing the user-authored video frame over the portion of the respective subject video frame of the subject content video comprises superimposing the user-authored video frame over the portion of the respective subject video frame as each user-authored video frame and subject video frame is recorded.

Embodiment 17 is the method of embodiments 15 or 16, wherein recording the subject content video comprises recording a subject soundtrack, wherein the subject soundtrack is synchronized in-time with each subject video frame of the subject content video, wherein recording the user-authored video comprises recording a user-authored soundtrack, wherein the user-authored soundtrack is synchronized in-time with each user-authored video frame of the user-authored video, and wherein generating the reaction video further comprises generating a reaction soundtrack from the user-authored soundtrack, the subject soundtrack, or both, wherein, for each reaction video frame of the reaction video, the reaction soundtrack is synchronized in-time with both the respective user-authored video frame and the respective subject video frame of the reaction video frame.

Embodiment 18 is a system comprising: one or more computers and one or more storage devices storing instructions that are operable, when executed by the one or more computers, to cause the one or more computers to perform the method of any one of claims 1 to 17.

Embodiment 19 is a computer storage medium encoded with a computer program, the program comprising instructions that are operable, when executed by data processing apparatus, to cause the data processing apparatus to perform the method of any one of claims 1 to 17.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
   receiving a request from a user using a user device to generate a reaction message for a platform, the platform being an online social messaging platform; and
   in response to the request, performing, by client software implemented on the user device, operations comprising:
      receiving a first input from the user identifying an incoming message of an incoming message stream coming into the user device from the platform, the incoming message comprising an incoming soundtrack;
      receiving a second input from the user using the user device, wherein the second input selects content from the incoming message as a subject content item;
      displaying the subject content item on a display of the user device;
      while displaying the subject content item, recording a user-authored video comprising a plurality of user-authored video frames and a user soundtrack;
      generating a reaction video, wherein the reaction video comprises a plurality of reaction video frames, wherein generating the reaction video comprises:
         generating, for each user-authored video frame, a reaction video frame including content from the subject content item and the content from the user-authored video frame;
         receiving a third input from the user that indicates one of the user soundtrack and the incoming soundtrack for a selected portion of the reaction video, and
         synchronizing the selected portion of the reaction video with the soundtrack indicated by the third input;
      generating, as the reaction message, a social messaging platform message comprising the reaction video; and
      posting the reaction message to the platform.

2. The method of claim 1,
   wherein the method further comprises sending the incoming message stream to the user device as metadata representing messages in the incoming message stream, including the incoming message;
   wherein generating, for each user-authored video frame, a reaction video frame comprises:
      rendering an image of the incoming message from metadata representing the incoming message, and
      superimposing the user-authored video frame over the image of the incoming message.

3. The method of claim 2, wherein, for each reaction video frame, the user-authored video frame for the reaction video frame appears as an image inset in the subject content item.

4. The method of claim 2,
   wherein the metadata representing the incoming message is formatted as a data object comprising respective fields for content of the incoming message, and
   wherein rendering the image of the incoming message from the metadata comprises rendering the content according to a predetermined visual arrangement.

5. The method of claim 1,
   wherein the incoming message comprises an incoming video, wherein selecting the content from the incoming message as the subject content item comprises selecting the incoming video as the subject content item, and wherein generating, for each user-authored video frame, the reaction video frame comprises superimposing the user-authored video frame over a portion of a respective incoming video frame of the incoming video.

6. The method of claim 5, wherein the user soundtrack is synchronized to the user-authored video.

7. The method of claim 1, wherein the request is a first request, the reaction video is a first reaction video, the user-authored video is a first user-authored video, and wherein the method further comprises:

receiving a second request from the user using the user device to generate a message that includes a second reaction video for the platform;

in response to the second request, performing, by server software implemented on one or more platform servers of the platform, operations comprising:

receiving, from the user device, a third request for a subject content video stored on the one or more platform servers;

in response to the third request, providing the subject content video to the user device;

receiving, from the user device, a second user-authored video, wherein the second user-authored video is recorded on the user device while the subject content video is playing on a display of the user device; and generating the second reaction video, wherein the second reaction video comprises a plurality of reaction video frames, wherein generating the second reaction video comprises generating a second reaction video frame for each second user-authored video frame of the second user-authored video, wherein each second reaction video frame comprises content from the subject content video and content from the second user-authored video.

8. The method of claim 7, wherein the subject content video stored on the one or more platform servers is a subject content video at a first resolution, and wherein providing the subject content video to the user device comprises providing the subject content video to the user device at a second resolution, wherein the subject content video at the second resolution is represented with less data than the subject content item at the first resolution.

9. A system comprising:

one or more computers and one or more storage devices on which are stored instructions that are operable, when executed by the one or more computers, to cause the one or more computers to perform operations comprising:

receiving a request from a user using a user device to generate a reaction message for a platform, the platform being an online social messaging platform; and in response to the request, performing, by client software implemented on the user device, operations comprising:

receiving a first input from the user identifying an incoming message of an incoming message stream coming into the user device from the platform, the incoming message comprising an incoming soundtrack;

receiving a second input from the user using the user device, wherein the second input selects content from the incoming message as a subject content item;

displaying the subject content item on a display of the user device;

while displaying the subject content item, recording a user-authored video comprising a plurality of user-authored video frames and a user soundtrack;

generating a reaction video, wherein the reaction video comprises a plurality of reaction video frames, wherein generating the reaction video comprises:

generating, for each user-authored video frame, a reaction video frame including content from the subject content item and the content from the user-authored video frame;

receiving a third input from the user that indicates one of the user soundtrack and the incoming soundtrack for a selected portion of the reaction video, and synchronizing the selected portion of the reaction video with the soundtrack indicated by the third input;

generating, as the reaction message, a social messaging platform message comprising the reaction video; and posting the reaction message to the platform.

10. The system of claim 9, wherein the operations further comprise sending the incoming message stream to the user device as metadata representing messages in the incoming message stream, including the incoming message;

wherein generating, for each user-authored video frame, a reaction video frame comprises:

rendering an image of the incoming message from metadata representing the incoming message, and superimposing the user-authored video frame over the image of the incoming message.

11. The system of claim 10, wherein, for each reaction video frame, the user-authored video frame for the reaction video frame appears as an image inset in the subject content item.

12. The system of claim 10, wherein the metadata representing the incoming message is formatted as a data object comprising respective fields for content of the incoming message, and wherein rendering the image of the incoming message from the metadata comprises rendering the content according to a predetermined visual arrangement.

13. The system of claim 9, wherein the incoming message comprises an incoming video, wherein selecting the content from the incoming message as the subject content item comprises selecting the incoming video as the subject content item, and wherein generating, for each user-authored video frame, the reaction video frame comprises superimposing the user-authored video frame over a portion of a respective incoming video frame of the incoming video.

14. The system of claim 13, wherein the user soundtrack is synchronized to the user-authored video.

15. The system of claim 9, wherein the request is a first request, the reaction video is a first reaction video, the user-authored video is a first user-authored video, and wherein the operations further comprise:

receiving a second request from the user using the user device to generate a message that includes a second reaction video for the platform;
in response to the second request, performing, by server software implemented on one or more platform servers of the platform, operations comprising:
receiving, from the user device, a third request for a subject content video stored on the one or more platform servers;
in response to the third request, providing the subject content video to the user device;
receiving, from the user device, a second user-authored video, wherein the second user-authored video is recorded on the user device while the subject content video is playing on a display of the user device; and
generating the second reaction video, wherein the second reaction video comprises a plurality of reaction video frames, wherein generating the second reaction video comprises generating a second reaction video frame for each second user-authored video frame of the second user-authored video, wherein each second reaction video frame comprises content from the subject content video and content from the second user-authored video.

16. The system of claim 15,
wherein the subject content video stored on the one or more platform servers is a subject content video at a first resolution, and
wherein providing the subject content video to the user device comprises providing the subject content video to the user device at a second resolution, wherein the subject content video at the second resolution is represented with less data than the subject content item at the first resolution.

17. One or more non-transitory computer-readable storage media encoded with instructions that, when executed by one or more computers, cause the one or more computers to perform operations comprising:
receiving a request from a user using a user device to generate a reaction message for a platform, the platform being an online social messaging platform; and
in response to the request, performing, by client software implemented on the user device, operations comprising:
receiving a first input from the user identifying an incoming message of an incoming message stream coming into the user device from the platform, the incoming message comprising an incoming soundtrack;
receiving a second input from the user using the user device, wherein the second input selects content from the incoming message as a subject content item;
displaying the subject content item on a display of the user device;
while displaying the subject content item, recording a user-authored video comprising a plurality of user-authored video frames and a user soundtrack;
generating a reaction video, wherein the reaction video comprises a plurality of reaction video frames, wherein generating the reaction video comprises:
generating, for each user-authored video frame, a reaction video frame including content from the subject content item and the content from the user-authored video frame;
receiving a third input from the user that indicates one of the user soundtrack and the incoming soundtrack for a selected portion of the reaction video, and
synchronizing the selected portion of the reaction video with the soundtrack indicated by the third input;
generating, as the reaction message, a social messaging platform message comprising the reaction video; and
posting the reaction message to the platform.

18. The computer-readable media of claim 17, wherein the operations further comprise sending the incoming message stream to the user device as metadata representing messages in the incoming message stream, including the incoming message;
wherein generating, for each user-authored video frame, a reaction video frame comprises:
rendering an image of the incoming message from metadata representing the incoming message, and
superimposing the user-authored video frame over the image of the incoming message.

19. The computer-readable media of claim 18, wherein, for each reaction video frame, the user-authored video frame for the reaction video frame appears as an image inset in the subject content item.

20. The computer-readable media of claim 18,
wherein the metadata representing the incoming message is formatted as a data object comprising respective fields for content of the incoming message, and
wherein rendering the image of the incoming message from the metadata comprises rendering the content according to a predetermined visual arrangement.

21. The computer-readable media of claim 17,
wherein the incoming message comprises an incoming video,
wherein selecting the content from the incoming message as the subject content item comprises selecting the incoming video as the subject content item, and
wherein generating, for each user-authored video frame, the reaction video frame comprises superimposing the user-authored video frame over a portion of a respective incoming video frame of the incoming video.

22. The computer-readable media of claim 21,
wherein the user soundtrack is synchronized to the user-authored video.

23. The computer-readable media of claim 17, wherein the request is a first request, the reaction video is a first reaction video, the user-authored video is a first user-authored video, and wherein the operations further comprise:
receiving a second request from the user using the user device to generate a message that includes a second reaction video for the platform;
in response to the second request, performing, by server software implemented on one or more platform servers of the platform, operations comprising:
receiving, from the user device, a third request for a subject content video stored on the one or more platform servers;
in response to the third request, providing the subject content video to the user device;
receiving, from the user device, a second user-authored video, wherein the second user-authored video is recorded on the user device while the subject content video is playing on a display of the user device; and
generating the second reaction video, wherein the second reaction video comprises a plurality of reaction video frames, wherein generating the second reaction video comprises generating a second reaction video frame for each second user-authored video frame of the second user-authored video, wherein each second reaction video frame comprises content from the subject content video and content from the second user-authored video.

24. The computer-readable media of claim 23,
wherein the subject content video stored on the one or more platform servers is a subject content video at a first resolution, and
wherein providing the subject content video to the user device comprises providing the subject content video to the user device at a second resolution, wherein the subject content video at the second resolution is represented with less data than the subject content item at the first resolution.

\* \* \* \* \*